United States Patent [19]

Kellogg

[11] 4,339,054
[45] Jul. 13, 1982

[54] PRESSURE RELIEVED PLUG AND SOCKET CLEANOUT ASSEMBLY

[76] Inventor: Charles W. Kellogg, 18220 NE. Cramer Rd., Battleground, Wash. 98604

[21] Appl. No.: 145,689

[22] Filed: May 1, 1980

[51] Int. Cl.³ .................. B65D 41/06; B65D 41/36
[52] U.S. Cl. ............................. 220/295; 220/303; 220/367; 220/231; 220/301; 138/92
[58] Field of Search .......... 220/293, 295, 298, 300, 220/301, 303, 213, 231, 367; 138/89, 92, 94

[56] References Cited

U.S. PATENT DOCUMENTS

| | | | |
|---|---|---|---|
| 1,456,601 | 5/1923 | Johnson, Jr. | 138/92 |
| 2,403,778 | 7/1946 | Zdanaitis | 220/301 |
| 2,636,634 | 4/1953 | Flubacker | 220/303 X |
| 2,867,350 | 1/1959 | Fleckenstein | 220/301 |
| 3,042,246 | 7/1962 | Welty et al. | 220/303 X |
| 3,537,956 | 11/1970 | Falcone et al. | 220/293 X |
| 3,756,287 | 9/1973 | Bishop | 138/92 |

*Primary Examiner*—George T. Hall
*Attorney, Agent, or Firm*—Eugene D. Farley

[57] ABSTRACT

A plug and socket cleanout assembly for fluid transmission lines, storage tanks, and like receptacles comprises a socket connectible to the receptacle and communicating therewith. A plug is removably seated in the socket, there being a relatively tapered interface between the plug and socket. Seal means is seated at the interface. Interengaging means carried by the plug and socket releasably interengage these two members in sealed relation to each other when the plug is seated in the socket. Pressure relieving means mounts in the plug and is manually operable to vent excess pressure from the receptacle.

3 Claims, 4 Drawing Figures

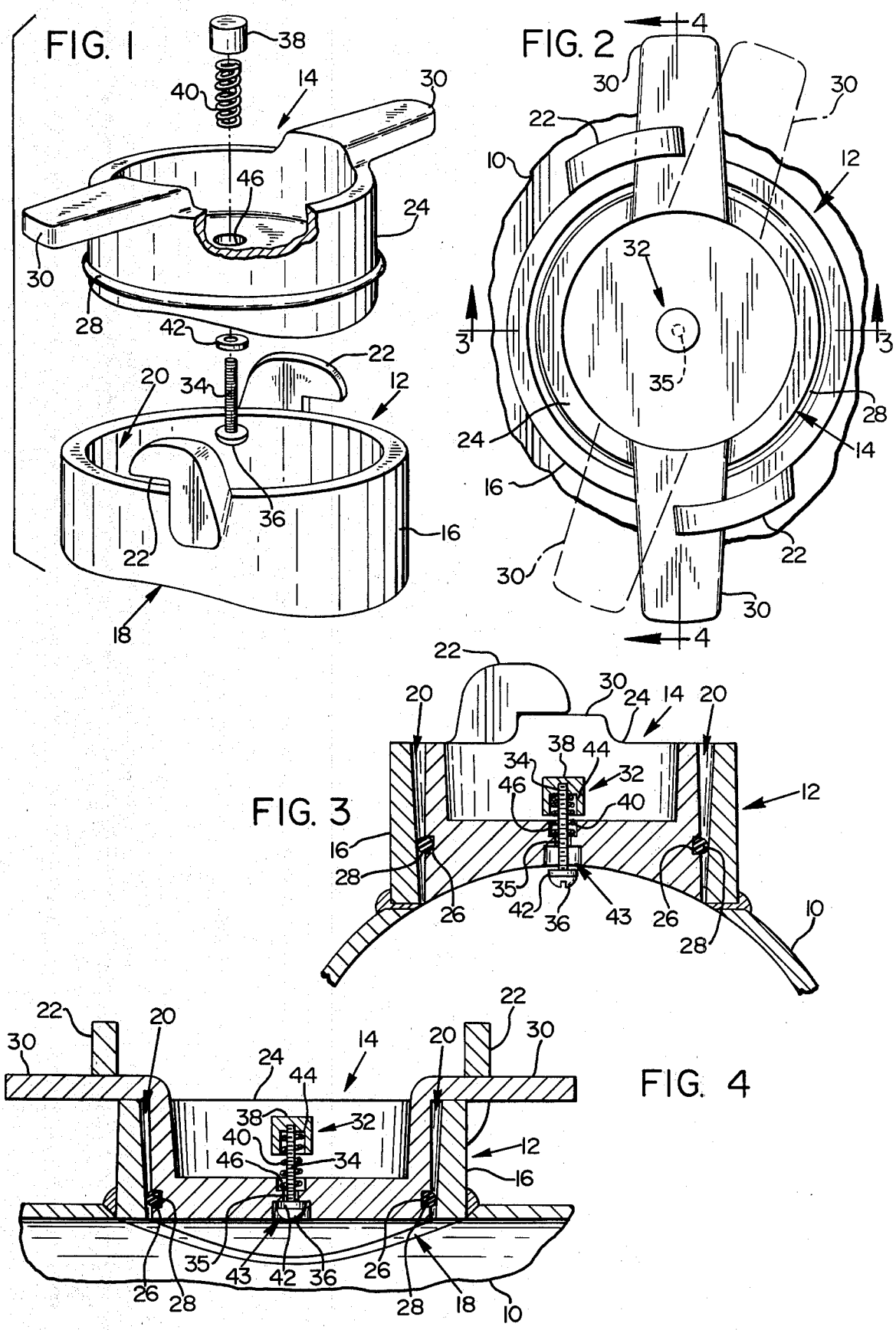

PRESSURE RELIEVED PLUG AND SOCKET CLEANOUT ASSEMBLY

BACKGROUND OF THE INVENTION

This invention relates to cleanout assemblies of the plug and socket type, such as may be employed to advantage in fluid transmission lines, storage tanks and like receptacles. It pertains particularly to such a cleanout assembly having a pressure relief valve to vent excessive pressure in the receptacle prior to opening the cleanout assembly.

In the chemical industry in general, and in the papermaking industry in particular, it is commonplace to transmit highly corrosive liquids from one processing station to another, and to store such liquids in suitably designed storage tanks. These operations frequently are carried out under conditions of high temperature and pressure.

In the wood composition board industry, it is commonplace to transmit solid wood particles entrained in a gaseous stream from one place to another.

In these and many other industrial procedures, prevention of plugging of the transmission lines and unplugging the lines once they have become plugged present serious problems. Further complications arise if the plugged lines maintain pressure even after the material flow has stopped.

Accordingly, it is the general object of the present invention to provide a cleanout assembly for fluid transmission lines, for storage tanks, and for like receptacles which contain materials susceptible to fluid flow, especially for such receptacles wherein the fluids are under pressure.

Further objects and advantages include the provision of a cleanout assembly for fluid transmission lines and the like which is:

Proof against leaks even though subjected to high temperature and pressure.
Resistant to the action of corrosive liquids.
Easy to open and close.
Tightly sealed.
Not subject to wear.
Easily installed.
Adaptable for use in various types of installations including elbows, straight pipes and tanks of varying dimensions.
Manually operable.
Installable in various locations.
Useful also as an inspection opening.
Provided with pressure release means for manually releasing pressure from within the receptacle, prior to opening.

Other objects and advantages of the present invention will be made apparent in the following specification and claims.

BRIEF SUMMARY OF THE INVENTION

In its basic concept, the present invention comprises a cleanout assembly for a fluid transmission line, storage tank or other receptacle. Socket means is attached to the receptacle in communicating relation therewith. Plug means is seated removably in the socket means, there being a relatively tapered interface between these two elements of the assembly. Seal means is seated at the interface.

Interengaging means releasably interengages the socket means and plug means in sealed relation to each other. Pressure relief means mounts in the plug means and is manually operable to vent excess pressure from the receptacle.

Upon assembling and interengaging the plug and socket means, a plug is provided which is proof against the escape of the contents of the line. The pressure relief means provides for an initial controlled release of pressure, whereupon the plug may be removed readily and without danger when a cleanout or inspection opening is desired.

BRIEF DESCRIPION OF THE DRAWINGS

FIG. 1 is a top perspective view of the herein described plug and socket cleanout assembly in separated condition, part being broken away to show the pressure relief means thereof.

FIG. 2 is a plan view of the cleanout assembly in assembled condition, illustrating the manner of opening and closing it.

FIG. 3 is a sectional view taken along the line 3—3 of FIG. 2 showing the pressure relieving means in its open condition.

FIG. 4 is a sectional view taken along the line 4—4 of FIG. 2 showing the pressure relieving means in its sealed condition.

DETAILED DESCRIPTION OF THE PREFERRED EMBODIMENT

The plug and socket cleanout assembly may be applied to a fluid transmission line 10 or other receptacle containing materials subject to fluid flow, i.e. both liquids and gases. It is designed particularly for heavy duty use in the large transmission lines which transmit chemical treating solutions at high temperature and pressure in the chemical and paper making industries.

The cleanout assembly includes a socket member, indicated generally at 12, and a plug member indicated generally at 14. Both of these may be fabricated from heavy gauge, resistant metal such as stainless steel, mild steel, or titanium. Depending upon the application, however, they may be fabricated from plastic or other less expensive materials.

In the illustrated form of the invention, socket member 12 comprises a case 16 which may be made from a section of heavy pipe. Its lower margin 18 is arcuate to conform to the curvature of transmission line 10 to which it may be connected by welding. Other means of connection may be employed, however, as by bolting or laminating it to the line at the selected location. This may be a trouble point where plugging is expected, or a point suitable for inspection of the interior of the line.

The inner side wall 20 of the case is tapered suitably to permit easy insertion of plug member 14.

The outer margin of the case is provided with a pair of diametrically opposite hooks 22. These are of substantial construction and dimensioned to receive cooperating lug members on the plug.

Plug member 14 preferably has a cupped body 24 having a diameter such that it fits easily inside socket member 12 with sufficient clearance at the interface between these two members to prevent freezing together when exposed to the action of corrosive liquids, or liquids having a high content of suspended or dissolved solids.

Appropriate seal means is included in the assembly to seal the interface betweeen the plug and socket members.

The seal means employed comprises an annular groove 26 in the outer side wall of plug member 14. An O-ring 28 made of resilient rubber or other suitable packing material is seated in the groove. The O-ring is sufficiently large so that it engages the inner side wall of socket member 12 in such a manner as to seal off the interface.

The outer margin of plug member 14 has a pair of integral, diametrically opposite, laterally extending locking lugs 30. These overlie the outer margin of socket member 16 and are received within locking hooks 22 of the latter.

A pressure relieving means is provided, shown generally at 32.

It includes a rod or bolt 34 extending through a hole 35 in the body of plug 24 and having a head 36 on its inner end. A manually operable button 38 is threaded on the outer end of the bolt. A spring 40, between the body of the plug and the button, biases the pressure relieving means outwardly.

A resilient washer 42 is mounted adjacent the head of the bolt 36. The washer forms a seal, proof against the material in line 10 escaping through hole 35.

Preferably the washer 42 and the head of the bolt 36 are countersunk into the body 24 of the plug at 43. This allows free flow of the material in line 10 without snagging on the bolt head.

Button 38 has a recess 44 therein, on the side facing hole 35. This functions to accept one end of spring 40 and to deflect material which may be forced through the hole.

Another recess 46 in the outer surface of the plug, coaxial with the hole, serves to seat the other end of spring 40.

OPERATION

The relationship between the plug and socket members is such that the plug may be inserted into the socket, pressed inwardly to attain a wedging fit of the O-ring 28, and then rotated relative to the socket until lugs 30 are received in hooks 22.

A cleanout assembly of great strength results. In normal situations, plug 14 cannot be dislodged from the socket even though substantial pressures are applied within transmission line 10.

It is to be noted, particularly in FIG. 3, that the inner end of plug 14 is contoured to match the curvature of the inner surface of transmission line 10 and to lie in the same curvilinear plane of said inner surface of the line when the plug is locked in the illustrated socket-closing position. This arrangement affords undisturbed flow of materials through the line 10.

When it is desired to remove the plug for purposes of cleanout or inspection, it is necessary to known if the line is under pressure, and if so, to gradually release the pressure prior to removal of the plug. This can be readily accomplished by operation of the presently described pressure relieving means.

Button 38 is pressed inwardly against the force of spring 40. This releases the seal formed by flexible washer 42 and allows excess pressure to escape through hole 35 past bolt 34.

Material which exits under pressure is deflected by the recess 44 in button 38. In this manner the excess pressure against the plug may be released safely and completely.

When the pressure on both sides of the plug is equalized, the plug may then simply be rotated until lugs 30 clear the hooks. Thereupon the plug may be removed, providing a cleanout or inspection opening, and reapplied after the contemplated operation has been completed.

Having thus described my invention, I claim as new and desire to protect by Letters Patent:

1. A plug and socket cleanout assembly for pressurized fluid transmission lines, storage tanks and like receptacles, the assembly comprising:
   (a) an annular socket member arranged for attachment to the outer side of a receptacle surrounding and extending outwardly from an opening through the receptacle,
   (b) a plug member configured for removable sealing reception within the socket member,
   (c) interengageable locking means on the socket and plug members arranged in the position of disengagement to allow removal of the plug member from the socket member and in the position of engagement to secure the plug member in sealing reception within the socket member,
   (d) the plug member being configured such that when it is in the position of sealing reception within the socket member the inner surface of the plug member substantially matches and lies substantially in the same plane as the inner surface of the receptacle, and
   (e) normally closed pressure relief valve means on the plug member arranged in said normally closed position within the plane of the inner surface of the plug member.

2. The plug and socket cleanout assembly of claim 1 wherein the pressure relief valve means comprises a rod extending freely through a hole through the plug member, a valve head on the inner end of the rod received in a counterbore of the hole to position the valve head within the plane of the inner surface of the plug member when the valve head is in normally closed position, and spring means interengaging the rod and plug member for urging the valve head to said normally closed position.

3. The plug and socket cleanout assembly of claim 2 including a threaded outer section on the rod opposite the valve head, and a button member threaded adjustably on the threaded outer section of the rod, the spring means comprising a coil spring encircling the rod between the button member and the plug member, whereby adjustment of the button member along the rod varies the compression of the coil spring.

* * * * *